Aug. 7, 1923.

W. B. SCHILTZ

DRAFT HITCH

Filed April 18, 1922    2 Sheets-Sheet 1

Wm. B. Schiltz INVENTOR

BY Victor J. Evans

ATTORNEY

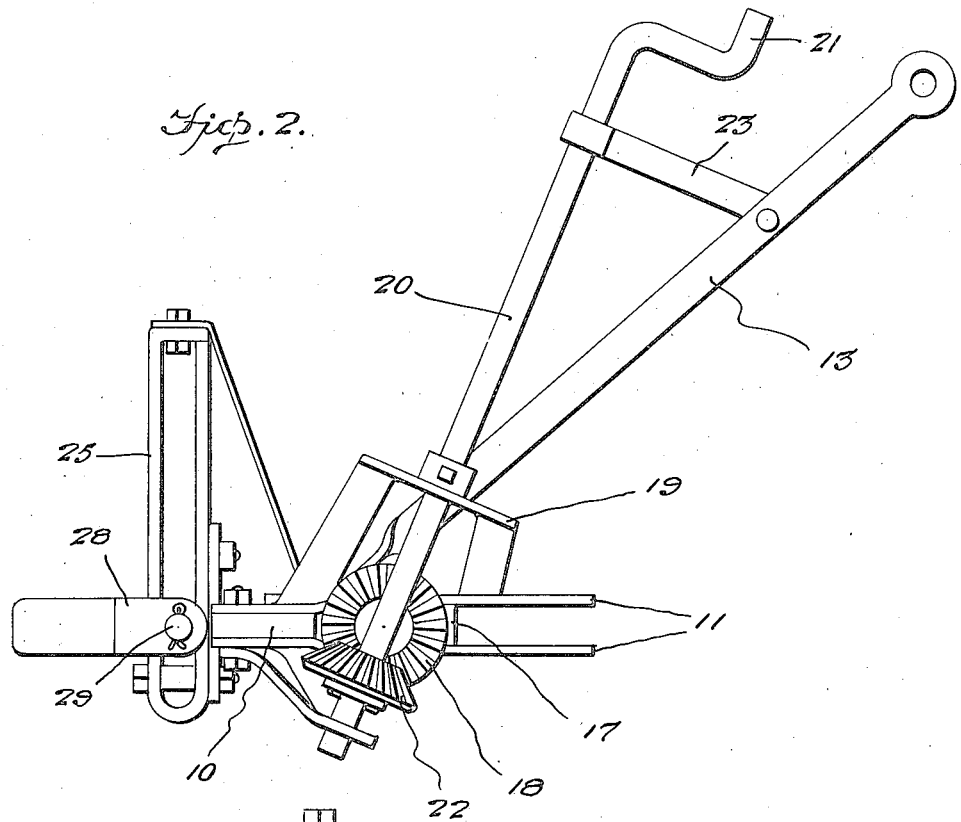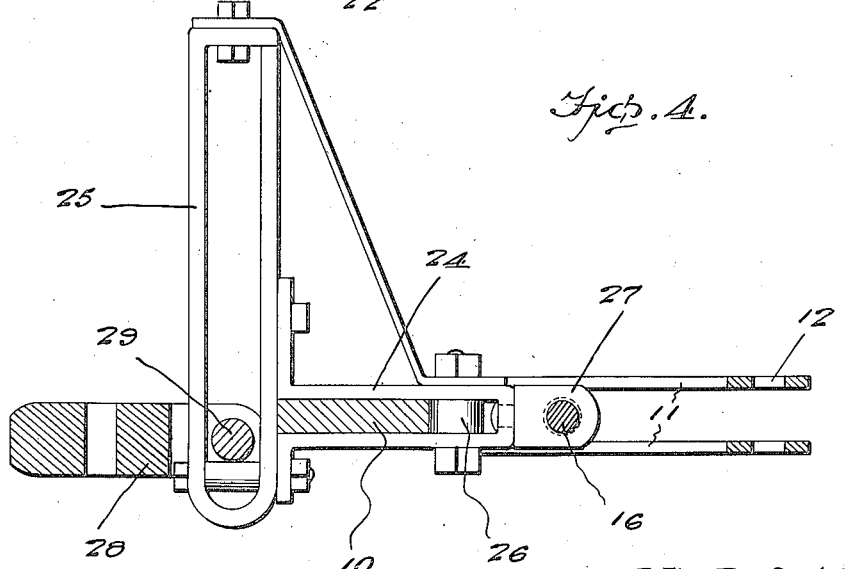

Patented Aug. 7, 1923.

1,464,446

UNITED STATES PATENT OFFICE.

WILLIAM B. SCHILTZ, OF CALEDONIA, MINNESOTA.

DRAFT HITCH.

Application filed April 18, 1922. Serial No. 554,362.

*To all whom it may concern:*

Be it known that I, WILLIAM B. SCHILTZ, a citizen of the United States, residing at Caledonia, in the county of Houston and State of Minnesota, have invented new and useful Improvements in Draft Hitches, of which the following is a specification.

This invention relates to draft devices and has for its object the provision of a novel device for coupling together a tractor and a plow, whereby to keep the plow even and the furrow of uniform depth under all conditions regardless of whether the plow be operated on a hill side or on uneven ground.

An important object is the provision of a hitch of this character which is so arranged that manual means is provided for controlling the relative positions of the parts so that adequate adjustment may be made to meet all requirements.

Another object is the provision of a device of this character in which means is provided for permitting the proper action to continue even though the tractor drop down into a dead furrow or depression which might ordinarily cause the plow to have an improper action.

An additional object is the provision of a device of this character which will be simple and inexpensive in manufacture, easy to install, highly efficient and durable in use and a general improvement in the art.

Figure 1:
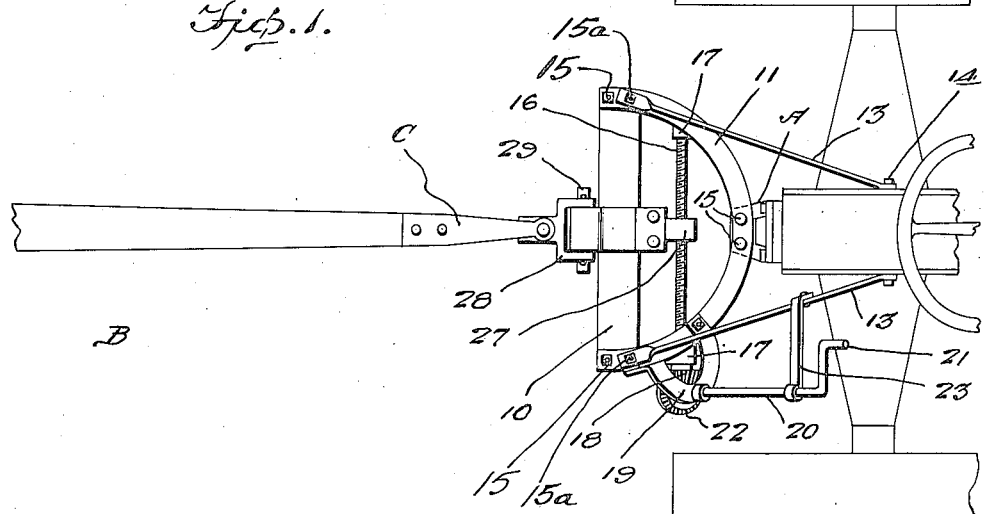
Figure 3:
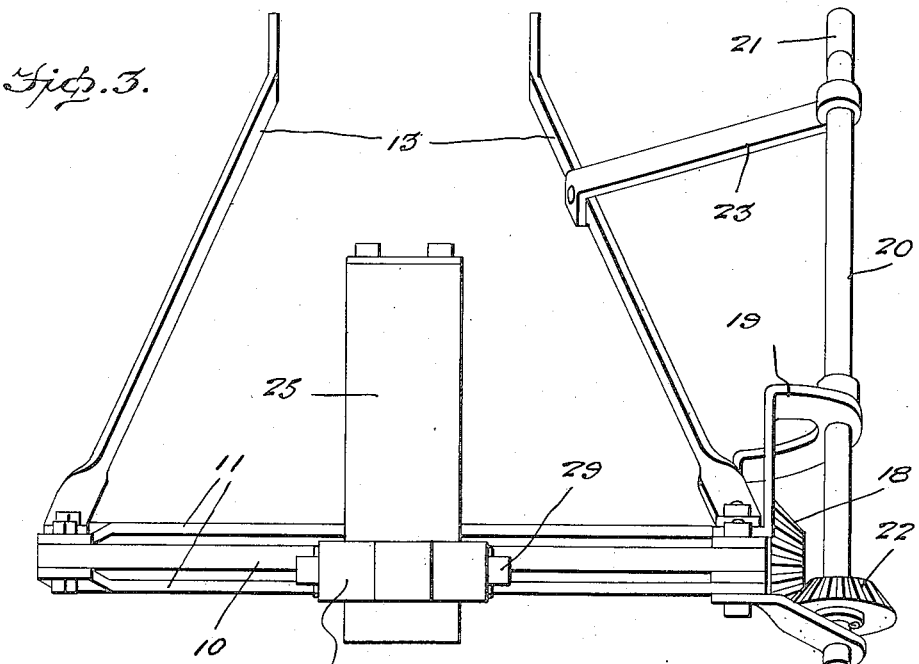

With the above and other objects and advantages in view, the invention consists in the details of construction to be hereinafter more fully described and claimed, and illustrated in the accompanying drawings, in which:

Figure 1 is a plan view of the hitch showing it associated with fragments of a tractor and plow, Figure 2 is a side elevation, Figure 3 is a front view, Figure 4 is a vertical section.

Referring more particularly to the drawings the letter A designates the draw bar of a tractor and B designates a plow beam carrying a clevis C. In carrying out my invention I provide a hitch which comprises an elongated flat plate 10 to the ends of which are secured spaced arcuate bars 11 which are formed with pairs of holes 12. Secured upon the junctures of the plate 10 and bars 11 are inclined bars 13 which have their free ends formed with holes for the passage of a bolt 14 passing through that portion of the tractor which carries the draw bar. The holes 12 are for the passage of bolts 15 and 15ª for the purpose of bolting the bars 11 to the plate 10 and holding the bars 13 in place. Arranged in spaced relation to the forward edge of the plate 10 is a screw 16 which is journaled through bearings 17 secured between the bars 11. One end of this screw carries a beveled pinion 18.

The operating means for the screw includes a bracket 19 which is bolted onto one bar 11 and which is formed with a bearing for a crank shaft 20 which has one end provided with a handle 21 and which has its other end carrying a beveled pinion 22 meshing with the pinion 18. The extremity of the shaft 20 is braced by a bearing bracket 23 which is secured to the other bar 11.

Supported upon the plate 10 is a carriage device 24 which is formed with a vertically elongated bearing loop 25. Mounted within this carriage are rollers 26 which engage the forward edge of the plate 10 for reducing friction. Extending from the carriage is a bracket 27 which is formed with a threaded hole engaged by the screw 16.

The numeral 28 designates a yoke which is secured to the plow clevis as shown and which carries a transverse rod member 29 slidably mounted within the bearing loop 25.

Assuming that the device has been constructed and mounted as above described and as shown in the drawings, it will be seen that the plow will be drawn by the tractor. When any tendency to side draft occurs, in order to counteract it and to insure true drawing of the plow in a straight line it is merely necessary that the operator grip the handle 21 and rotate the shaft 20 and consequently the screw 16 which will result in moving the carriage 24 longitudinally of the plate 10 for varying the point of connection or the point of draft between the tractor and the plow. This movement is easily effected in one direction or the other and the weight of the load makes no appreciable difference on account of the provision of the anti-friction rollers. In case the tractor drops into a dead furrow or depression when going over uneven ground the yoke 28 may slide along the bearing loop 25 and thus compensate for this action so that the plow will be drawn true even under such conditions.

From the foregoing description and a study of the drawings it will be apparent that I have thus provided a simply constructed and consequently inexpensive hitch by means of which a plow or the like may be drawn by a tractor in an absolutely true line and so as to cut to a uniform depth even under the most adverse conditions, ample provision being made for making all adjustments which may be found necessary and the arrangement being such as to permit dropping of the tractor without affecting the position of the plow.

While I have shown and described the preferred embodiment of the invention, it is of course to be understood that I reserve the right to make such changes in the form, construction and arrangement of parts as will not depart from the spirit of the invention or the scope of the subjoined claim.

Having thus described my invention I claim:

A draft hitch comprising a plate, arcuate bars secured at their ends to the ends of said plate and secured at their center to the tractor, inclined brace bars connected at one end with the tractor and having their other ends secured to the junctures of the plate with the arcuate bars, bearings mounted between said arcuate bars, an operating screw journaled through said bars parallel with said plate, a carriage slidable along said plate, said carriage including a vertical elongated loop bearing, a yoke vertically slidably mounted within said loop bearing and means for turning said screw.

In testimony whereof I affix my signature.

WILLIAM B. SCHILTZ.